Figure 1:
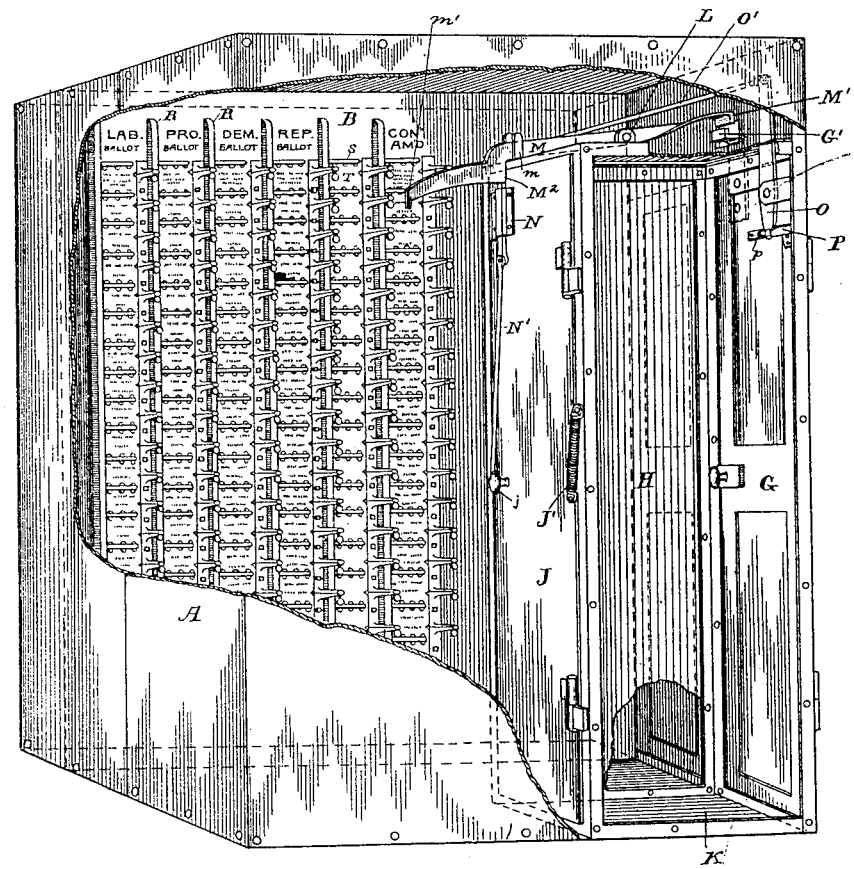

(No Model.)

J. H. MYERS.
VOTING MACHINE.

No. 424,332.

5 Sheets—Sheet 1.

Patented Mar. 25, 1890.

Witnesses
J. Watson Sims
Thomas Durant

Inventor
Jacob H. Myers
by Church & Church
his attys

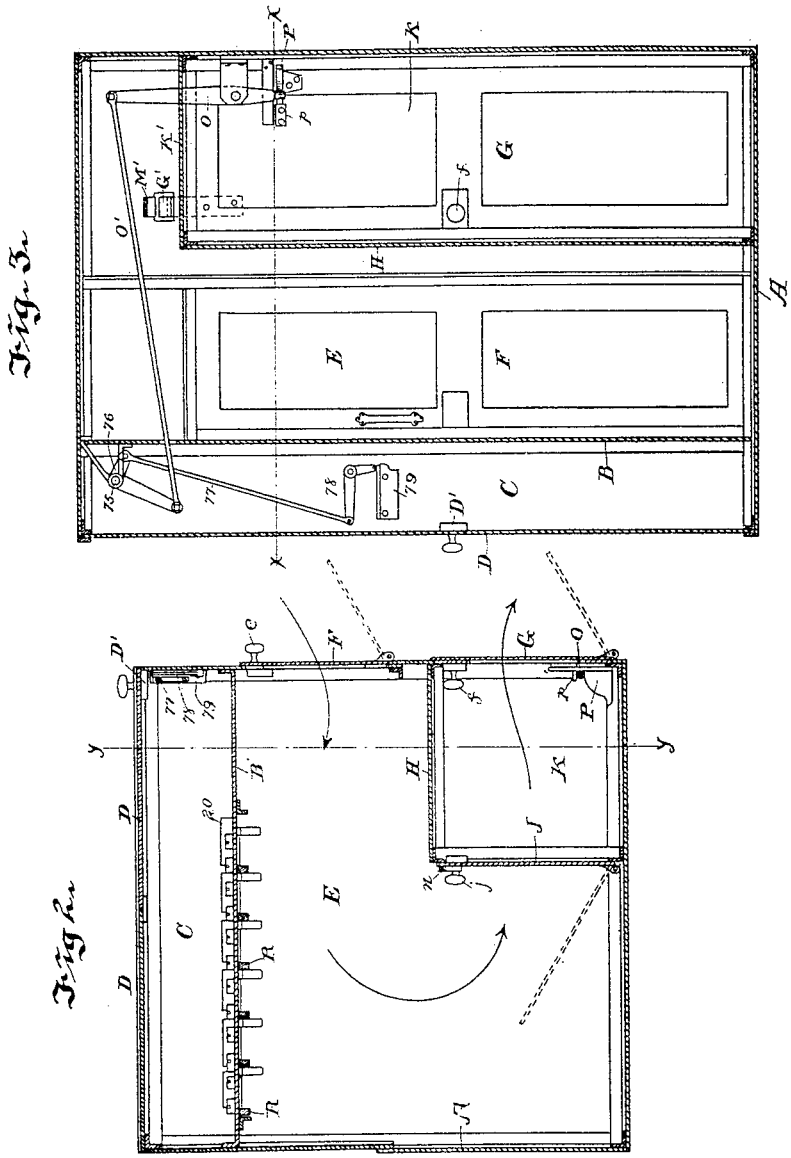

285. REGISTERS,
Voting Machines,
Key Operated.
(No Model.)　　　　　　　J. H. MYERS.　　　　　5 Sheets—Sheet 3.
VOTING MACHINE.
No. 424,332.　　　　　　　　　　　Patented Mar. 25, 1890.
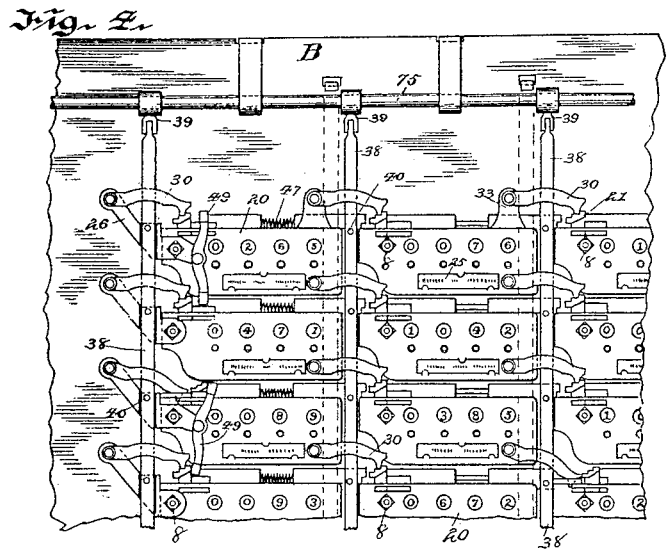
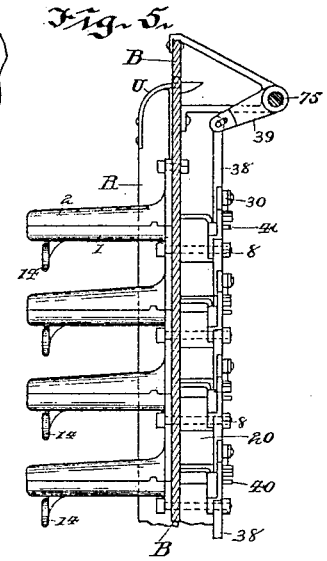
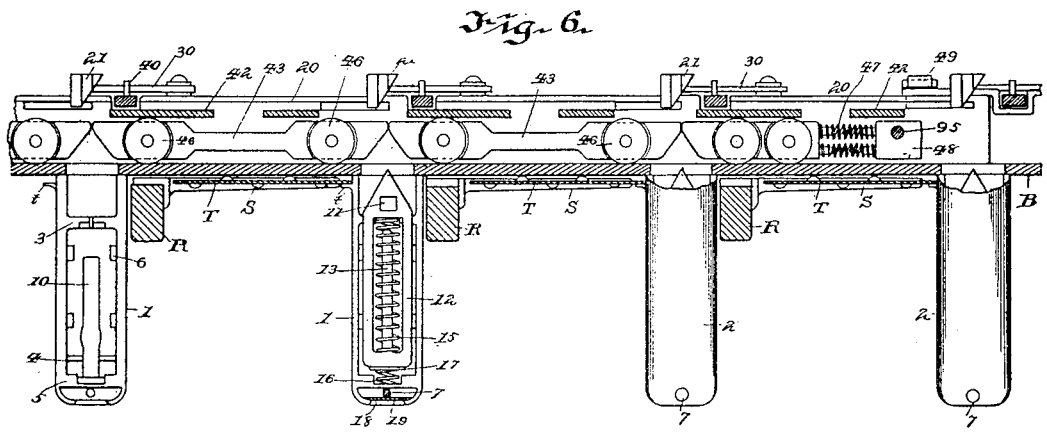
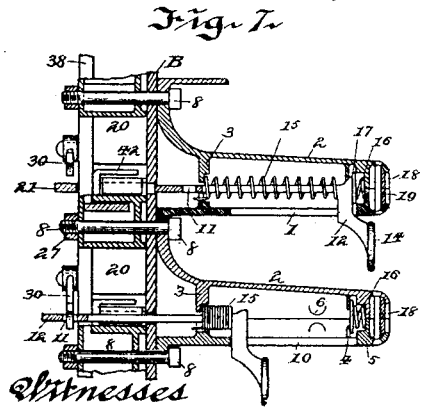
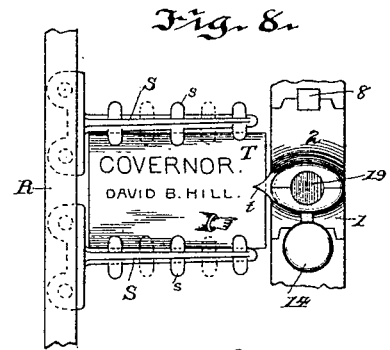
Witnesses
Inventor
Jacob H. Myers
by Church & Church
his Attys (No Model.)   J. H. MYERS.   5 Sheets—Sheet 4.
VOTING MACHINE.

No. 424,332.   Patented Mar. 25, 1890.

Witnesses

Inventor
Jacob H. Myers

235. REGISTERS,
   Voting Machines,
   Key Operated.

(No Model.)

J. H. MYERS.
VOTING MACHINE.

5 Sheets—Sheet 5.

No. 424,332.

Patented Mar. 25, 1890.

Witnesses
J. Watson Sims
Fred F. Church

Inventor
Jacob H. Myers
by Church & Church
his Attorneys

N. PETERS, Photo-Lithographer, Washington, D. C.

UNITED STATES PATENT OFFICE.

JACOB H. MYERS, OF ROCHESTER, NEW YORK.

VOTING-MACHINE.

SPECIFICATION forming part of Letters Patent No. 424,332, dated March 25, 1890.

Application filed December 24, 1889. Serial No. 334,801. (No model.)

*To all whom it may concern:*

Be it known that I, JACOB H. MYERS, of the city of Rochester, county of Monroe, and State of New York, have invented certain new and useful Improvements in Voting-Machines; and I do hereby declare the following to be a full, clear, and exact description of the same, reference being had to the accompanying drawings, forming a part of this specification, and to figures and letters of reference marked thereon.

My present invention relates to that class of voting or balloting machines illustrated in my prior patents, Nos. 415,548 and 415,549, dated November 19, 1889, and it has in common with said patented devices for its object to provide means whereby an honest vote can be had and counted without the liability of voters being intimidated, the balloting being secret, or of their voting more than once for the same candidate or different candidates for the same office, and as the votes are counted as fast as the voter indicates his preference the total number cast for each candidate can be ascertained rapidily and accurately at the close of the polls.

With these objects in view the invention consists in certain novelties of construction and combinations of parts, all as will be hereinafter fully described, and the novel features pointed out in the claims at the end of this specification.

The present machine embodies the same general features shown in my prior patents—
that is, a booth or chamber containing the operating parts, which the voter enters to indicate his choice of candidates, and prevent his voting for more than one candidate for the same office or voting more than once for the same candidate, by so arranging the parts that after the proper number of votes are cast or indicated and counted no more can be counted until the voter leaves the booth, when the parts will be returned to normal position ready for the next voter.

Figure 2:
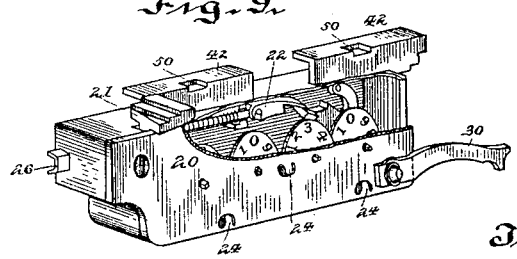
Figure 10:
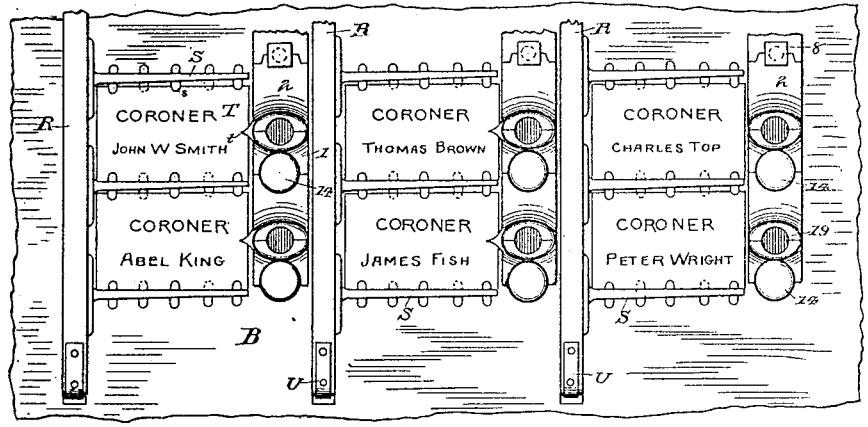
Figure 12:
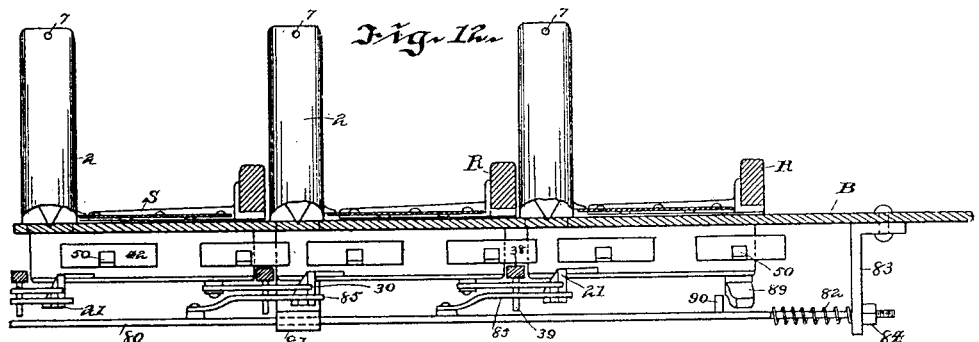
Figure 13:
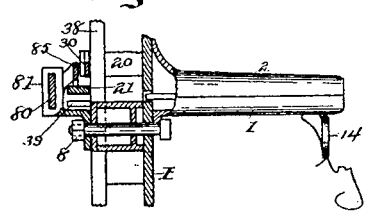

In the accompanying drawings, Figure 1 is a perspective view of a booth or chamber constructed in accordance with my present invention, portions of the casing and partitions being broken away to show the parts; Fig. 2, a horizontal sectional view of the booth, taken on the line $x\,x$, Fig. 3; Fig. 3, a section on the line $y\,y$ of Fig. 2; Fig. 4, a rear view showing the disposition of the counting and key-releasing devices; Fig. 5, a section of the partition, showing the push-keys in side elevation; Fig. 6, a horizontal sectional view showing a series of push-keys and the interlocking devices between them; Fig. 7, a sectional view through two of the push-keys, showing one of them operated and locked; Fig. 8, a front view of a push-key and indicating-card; Fig. 9, a perspective view, partly in section, of one of the counters. Fig. 10 is a front view of another portion of the front of the partition; Fig. 11, a rear view of the same; Fig. 12, a section through the partition, showing the interlocking devices between the keys in top plan; Fig. 13, a cross-sectional view on the line $z\,z$ of Fig. 12. Figs. 14 and 15 are detail views showing positions occupied by the interlocking devices.

Similar letters and figures of reference in the several figures denote similar parts.

Referring particularly to Figs. 1, 2, and 3, the letter A represents the booth or chamber containing the operating parts, preferably constructed of metal of suitable thickness, formed in sections adapted to be bolted together, capable of being readily taken apart and stored, or of being set up in the room or place where the election is to be held. Extending across this chamber is a partition or wall B, dividing the booth into compartments or chambers, the one C containing the counting and operating mechanism, accessible only to the judges and inspectors of election by the removal of sliding panels or doors D, held secured by a lock D'. The other compartment E is accessible to the voter to indicate his choice of candidates. The front of the booth is provided with doors F and G, the former constituting the entrance-door and provided with a spring-lock having an operating-handle $e$ on the outside only, and the latter having a spring-lock thereon with an operating-handle $f$ on the inside of the booth only and serving as an exit-door, the construction of both being such that a voter must enter through door F and emerge through door G. Inside the compartment E is a partition H, forming with an interior door J a compartment or vestibule K inside of the door G, said door J being provided with a spring-lock with its operating-knob j on the inside of chamber E. The top of the vestibule K is covered by a plate K', having a bracket L thereon, and pivoted in this bracket is a lever M, having a hook M' formed in its outer end adapted to engage a corresponding hook G' on the upper portion of door G, which projects through an aperture in the casing. On the other side of its pivot the lever passes between guides m, extends downward, forming a shoulder M², and then bent around in an arc, preferably that traversed by the edge of door J, and provided with a hook m' on its end, as shown. To the upper inner side of the door J is secured a bolt N, whose upper end comes directly beneath the edge of lever M, and its lower end is connected by a connecting-rod N' with an arm n on the handle j of door J. The preponderance of the weight of the lever M is inward, keeping the shoulder M² over the edge of door J, thereby locking it while the hooks M' G' are disengaged; but when the handle j is operated to unlock door J the bolt N will raise the lever releasing the door, and the edge of the latter will hold the end of lever M elevated and the hooks M' G' in engagement as long as the door is open, thereby keeping door G locked until the person steps into the vestibule, when a spring J' closes door J behind him, the lever M locking it, and he then opens door G and goes out, the opening of door G releasing the ballot-indicating devices, as in the beforementioned patents.

As in the patented machines, the ballot-counters are in compartment C and the push-keys accessible from chamber E, and said keys are locked after being once operated, and only released after the voter has left their proximity without possibility of returning.

The releasing devices, operated by a rock-shaft, are moved by the exit-door in the following manner: To a bracket inside of door G is pivoted a lever O, having its upper end connected by a rod O' with a crank-arm on the rock-shaft 75 in compartment C, which actuates the releasing devices. The lower end of the lever O rests against a cam P, secured to the inner side of door G, and serves to turn the lever and actuate the key-releasing devices when the door is opened. For the purpose of preventing the operation of the lever without opening the door a lug or projection p is provided, between which and the cam the lever normally rests. Connected to an arm 76 on shaft 75 is a rod 77, pivoted to a bell-crank 78, which actuates a counter 79, so that the latter will be moved, indicating one vote every time the door G is opened, thus determining the entire number of votes at any time, the dials of this counter being visible from the exterior of the booth.

The inner face of the partition or wall B is divided off, as before, into suitable vertical divisions or spaces, one being devoted to each party or denomination, and as many divisions may be made as desired, though I have shown six, devoted to the Democratic, Republican, Prohibition, and Labor Parties, the one being left blank for any other desired, and one, preferably on the end, being devoted to any question upon which popular vote is necessary, as a constitutional amendment, the votes in this instance indicating an expression for or against its adoption.

In each of the divisions, and next the push-keys devoted to them, are placed signs or ballot-cards bearing the names of the particular candidates and the offices for which they are nominated, as, if the machine is to be used for a State election, the upper one may contain the words "For Governor," giving the candidate's name, the next "For Lieutenant-Governor" and the candidate's name, and so on through the list of nominees. As a convenient means for holding these cards designating the candidates' keys in position, and preventing their removal except by authorized persons, I provide suitable bars R, preferably extending the length of the partition, or at least that of the rows of keys, having in one side suitable castings or brackets S, each bracket having on opposite sides lugs or projections s, arranged in two rows a sufficient distance apart for the insertion of a ballot-card T of the candidate's party color, and bearing his name and the office for which he is nominated. These cards abut at one end against the bar R or casting S, and are prevented from movement in that direction, and when in position between the rows of push-keys the edge of the card will project beneath an index-lug t on the side of the push-key casing, (farther on described,) which index will not only serve to indicate that the key is devoted to the person whose name appears on the card, but also serves to hold the card in place and prevent its removal. The bars R may be locked in place in any suitable manner; but a simple form of fastening is provided by attaching to the ends thereof, and, if desired, at intermediate points, suitable spring-catches U, (see Fig. 5,) projecting through apertures in the partition when in place and incapable of removal except by disengaging the catches from the compartment C.

The ballot push-key casings are in the present instance constructed in two parts 1 and 2, the former constituting the lower portion and preferably hollow, provided with interior cross ribs or projections 3, 4, and 5, suitable key-supporting lugs or flanges 6 at the sides, and a slot 10 in the lower side, as in Fig. 6 at the left. The upper part 2 of the casing preferably has ribs or lugs 3, 4, and 5 corresponding to those on the lower, and the two casings are fastened together at the outer end by a suitable rivet 7, as shown. The upper and lower ends of the succeeding key-casings are provided with lugs and recesses, as in Fig. 8, and the securing-bolts 8, fastening them in position and to the partition B, are passed through between them, having a bearing on the upper and lower sections of each succeeding casing, as in Fig. 8.

The push-keys 12 (shown in Figs. 6 and 7) are preferably constructed of flat material, as in Patent No. 415,549, with the beveled ends, the aperture 11 near the end, the central tongue 13, and the downwardly-extending shank having the knob 14 on the end arranged below the tubular portion of the casing, as shown, and the spring 15 encircles tongue 13 and abuts against lugs or flanges 3 on the casing-sections, projecting the key as in the upper portion of Fig. 7. Between the flanges 4 and 5 is arranged a short spring 16 and a washer or disk 17, against which the key abuts when projected, serving as an elastic buffer to take up excessive jar when the key is released and projected. The end of the key-casings are provided with an opening 18, in which is preferably inserted a disk or card 19 of the color designating the party to which the particular candidate belongs, so that there will be no liability of the keys being mistaken by ignorant or careless voters.

By making the key-casings as described and extending the push-knob below I not only provide a firm bearing for the key, rendering it less liable to be broken or damaged, but also facilitate the assembling of the parts and securing them together with few securing-bolts, as farther on described. It will be understood that the casings could be made of a single casting and the knobs 14 made separate and passed up through the slot 10; but I prefer the arrangement shown, as the parts are strong and readily secured together.

On the rear side of the partition B and within chamber C are located the counters 20, consisting of a train of wheels geared together, as in Fig. 9, and actuated by a movable projection or slide 21, carrying a pawl 22 for actuating the first gear of the train. The numbers placed on the various gears are visible through apertures provided in the outer side of the casing, so that the number of votes received by a candidate can readily be ascertained by an inspection of the face of the counter. In the outer face of the counter-casing are provided a series of lugs 24, for holding in place designating-cards 25, showing to which candidate the counter is appropriated.

The counters and keys, as in the prior patents referred to, are arranged side by side, those for the same officers being in the same plane, and their casings are provided with lugs 26 at opposite ends, which engage with each other and prevent independent movement, while the securing-bolts 8 pass through the casing and partition B, the head on the end engaging the key-casings and the nuts 27 holding them firmly in position. Thus a single bolt for each counter locks both the counter and key casings in position.

The head of the slide 21, carrying the counter-actuating pawl, is beveled on one side, as shown, with which beveled portion the inclined key end co-operates to actuate it laterally as the key is moved in, and its upper side is formed with a series of notches or steps, as shown, with which the key-retaining dogs co-operate. These key-retaining dogs 30 are preferably pivoted upon the rear lower sides of the counters (excepting those in the top and end rows) and their ends rest upon the tops of the slides 21, with which they co-operate, as in Fig 4, operating, when the slides are moved laterally by the push-keys, to drop down and enter the apertures 11 near the end of the keys, as shown. It will also be noted that by reason of the steps formed in the slide that if the key is moved far enough in to actuate said slide, and it is moved a short distance only, the dog will drop behind the top notch or step and prevent the slide moving back to first position, but will retain it until actuated by the release of all the dogs when the voter leaves the booth, and the parts are so constructed that the pawl will not be moved a sufficient distance to actuate the counter until the retaining-dog drops into recess 11 in the key.

The retaining-dogs of the series of counters in the top row are preferably mounted upon projections 33, formed upon or attached to the counter-casings, and those of the first or end row of counters are pivoted upon brackets 26, secured to the ends of the counter-casings, as shown. It will be noted that the retaining-dogs of each series of counters project across the spaces between adjacent ones, and in these spaces are arranged vertically-movable rods 38, connected at the upper end to arms 39 on rock-shaft 75, and provided at intervals in their length with pins or projections 40, located, when the bars are in lowest position, beneath the key-retaining dogs of the series, and adapted when lifted by the rocking of shaft 75, as before described, to raise all of said dogs and release the push-keys, allowing their springs to retract those pushed in and held.

Formed upon the upper sides of the counter-casings are guides or overhanging flanges 42, between which and the top of the casing are located the sliding blocks 43, constituting the interlocking devices between the push-keys, the open sides of the recesses in which they are located being closed by the partition B when the counters are in place. These blocks are constructed, as before, with the beveled ends with which the ends of the keys co-operate, and the amount of movement permitted the series is just the width of a single key, so that when one key in a line devoted to candidates for the same office is pushed in the block will be moved so as to prevent the introduction of a second one. The blocks are provided near opposite ends with rollers or wheels 46, which co-operate with the guides and prevent excessive friction, and said blocks are properly positioned, as before, by springs 47, inserted between the end blocks of the series and the stationary abutments 48, as shown.

As it may be desirable to devote one series of the push-keys to questions not confined to party measures, as the adoption of a constitutional amendment, and, as there should be devices whereby an ignorant person could not nullify his vote by voting for and against it, I arrange the first series of keys near the door with locking devices between them operating vertically, in the present construction employing levers 49, (see Fig. 4,) pivoted to the back of a counter-casing with their ends in proximity to the counter-slides of two counters so arranged that when one slide is operated by a key and held by the retaining-dog the other cannot be operated, as shown in said figure at the bottom.

When there are several officers of the same kind to be voted for, as coroners, it is of course desirable to have the parts so arranged that a voter can cast his ballot for as many of them as there are party candidates, and no more, as if there are two candidates for each party he may wish to vote for one Republican and one Democrat, but if the push-keys are in the same line and the interlocking devices the same as above described he could only vote for one of them, the second push-key being locked by the operation of the first. It is also desirable, under the above circumstances as well as all others, to maintain the arrangements of party candidates described and shown, and with a view to maintain these conditions and to provide a simple interlocking device between the push-keys which could be used, if desired, instead of the sliding blocks before described in single lines of candidates, I preferably construct the parts as follows: The counters and ballot push-keys are the same as before described. Instead of employing the sliding blocks between the keys, I arrange back of each line of counters suitable bars 80, adapted to slide horizontally in bearings 81, secured to the counter-casings by the bolts holding the counters and key-casings, as shown, or by other suitable means, and at one end reduce these bars and encircle the end with springs 82, held between the shoulders formed by reducing the ends and a plate or bracket 83, secured to the partition B or other support. Said springs operate to hold the bars pressed, preferably in a direction opposite to that in which the counter-operating slides 21 are actuated by the keys, and their motion is limited by the adjustable nuts 84 on the ends engaging the bracket 83. Pivoted upon these bars is a series of dogs 85, one for each key, each having three teeth 86, 87, and 99, the last-mentioned tooth engaging the sides of the counter-slides 21 in the present instance, though any movable pieces actuated by the keys will answer, said dogs projecting across between the adjacent counter-casing (in the present instance) in proximity to the key-retaining dogs 30, so that the projections 39 on the vertically-moving dog-releasing rods 38 will engage and lift said dogs when they are operated to release the keys.

The operation of the bar 80 is caused by the keys in the following manner: When the parts are in their normal position, no votes having been indicated, the end teeth 99 of the dogs 85 are in engagement with the counter-slides 21. If, now, a push-key is operated, it causes the movement of the counter-slide, as before described, indicating one vote for the candidate to whom it is appropriated, and through the dog 85 moves the bar 80 with it against the tension of spring 82, this movement causing the remaining dogs 85 to slide up on the counter-slides 21, the second teeth 87 dropping behind the said slides, (see Fig. 14,) and the push-key operated becomes locked by its retaining-dog 30, as before, preventing the retraction of the bar. Should a second key in the same line be operated, it will, as before, cause the movement of the counter-slide and through the dog 85 a further movement of the bar 80, and the key becoming locked will hold said bar in this position. Now the third tooth 99 is in engagement with the slides that have not been operated, as in Fig. 15, and if it is designed to permit the operation of only two keys in a line a suitable stop is provided for the bar 80, preventing its movement, and as the dogs are locked to it by teeth 86 on the dogs their further operation is prevented. The keys holding the bar locked are released as before, the lifting of the rods 38 releasing the key-retaining dogs and also the dogs 85, permitting springs 82 to return bars 80 to normal position, so that when the dogs are dropped again they will assume normal position on top of the counter-operating slides. This arrangement of interlocking devices could be employed to permit two keys in any row to be operated, if desired for any purpose, or by permitting the bar 80 a greater extent of movement and increasing the number of teeth on the actuating-dogs the number of candidates to be voted for could be increased, if desired.

In the present embodiment of this portion of the invention I have shown the parts as arranged to permit the balloting for any two candidates, this being the number nominated by each party, in Fig. 10 the party to the left being the Prohibition, the next the Democratic, and the next the Republican, and in Fig. 11 (taken from the rear) the counters for the respective candidates are designated by cards bearing their names, as before.

Pivoted between the bars 80, if two only are employed, is a lever 89, swinging freely on its pivot, with its ends in position to be engaged at proper times by projections 90 on the inside of the bars. In the present construction, which is designed to show the capabilities of this portion of the machine when any two of a number of candidates are to be voted for, the stops 90 are so arranged relative to the ends of lever 89 that if bar 80 is moved by the operation of one key in, say, the upper line, the stop will be moved up in contact, or nearly so, with the lever end, and if moved by the operation of two keys in the same line the lever will be turned on its pivot, bringing its lower end close up against the projection 90 on the lower bar 80, and as the upper bar will be locked after being actuated the lever 89 will prevent the operation of any key in the lower row. So, also, if one key in the upper row is operated it will move the upper bar to bring its projection 90 close up to or against lever 89, and then if one key in the lower row is operated, as if the voter is voting for two Republicans, the stud 90 on the lower bar will be brought up against the end of the lever, and, both bars being locked in this position, the further operation of the device is prevented.

The blocks or abutments 48, for limiting the movements of the sliding blocks 43, (shown in Fig. 6,) are preferably held in position by rivets or studs 95, which are passed through apertures 50, formed in the flanges 42 and through the blocks, those in the various series below the top one being held from accidental displacement by the counter-casings above them, which project in close proximity to their tops when in position. There are two apertures 50 formed in the flanges, so that all the counter-casings can be made from the same patterns, and by the use of the rivets or stops in either one aperture or the other any counter can be adapted for use on either end of the row, as will be understood.

The operation of this machine will now be readily apparent. The booth is set up in the room where the election is to be held, and the judges and inspectors are in front of the booth to pass upon the qualifications of the voter, and if he is found qualified he enters the booth by door F and closes it behind him. Once inside he operates the push-keys devoted to the candidates he wishes to vote for, which become locked, preventing a second operation, and the interlocking devices preventing his nullifying any vote he may cast, as described. After he has finished voting he turns the knob of door J, thereby releasing this door and locking door G, then passes into the vestibule, the door J closing and locking behind him, and thus releasing door G he may emerge from the booth, the operation of the last-mentioned door through lever M, rock-shaft 75, and lifting-rods 38 releasing all the push-keys, allowing their springs to project them again, ready for operation by the next voter. At the close of the election the doors D' are unlocked and opened, and the clerks, judges, and inspectors proceed to read from the respective counters the numbers of ballots cast for each candidate, and record the same.

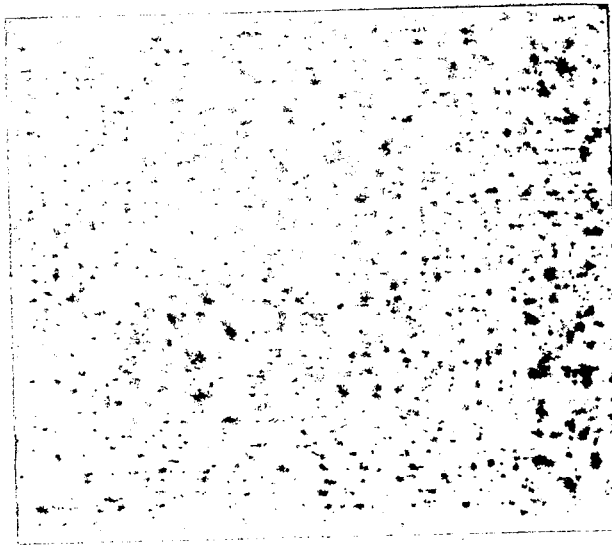

I claim as my invention—

1. In a voting-machine, the combination, with a booth or chamber containing self-locking voting apparatus accessible from the inside, having a vestibule, of a door for affording access to the vestibule from the chamber, a door opening out of said vestibule, a lever engaging and locking said two doors alternately, normally engaging the inner one and operating to hold the outer door locked all the time the inner one is open and connections between one of said doors and the voting apparatus for releasing the latter, substantially as described.

2. In a voting-machine, the combination, with a booth or chamber containing self-locking voting apparatus accessible from the inside and having a vestibule, of a door for affording access to the vestibule from the chamber, a door opening out of the vestibule, a lever locking the two doors alternately, having the engaging-hook, shoulder, and curved extension and connections between the outer door and the voting apparatus for causing the release of the latter by the operation of the former.

3. In a voting-machine, the combination, with a booth or chamber containing self-locking voting apparatus accessible from the inside and having a vestibule, of a door for affording access to the vestibule from the chamber having a knob and bolt, a lever having the hook, shoulder, and extended portion operated by the bolt on the door, and connections between the outer door and the voting apparatus for causing the release of the latter by the opening of the door, substantially as described.

4. In a voting-machine, the combination, with a booth and a door leading therefrom, a series of balloting-keys, retaining-dogs therefor, and releasing devices for said dogs, of a cam located on the said door, a lever operated thereby for operating the releasing devices, and a projection on the door between which and the cam the lever is normally confined, substantially as described.

5. In a voting-machine, the combination, with a ballot push-key and the casing therefor having a projection, of a movable card-rack, a card or tablet held therein on three sides, and catches for holding said rack in proximity to the key-casing, with the projection on the latter holding the card in position, substantially as described.

6. In a voting-machine, the combination, with a plate or support and a series of ballot-indicating devices thereon, of a card-rack having a series of card-receptacles open at one end and two or more catches for holding said racks against the support with the open ends toward the ballot-indicating devices, substantially as described.

7. The combination, with a tubular casing having a longitudinally-extending slot therein, of a key located within and movable longitudinally of the casing and having an operating projection extending through the slot, a spring for retracting said key, and a counter actuated by the key when projected, substantially as described.

8. The combination, with a ballot push-key and a spring for retracting the same, of a spring-buffer for arresting the movement of the key caused by the retracting-spring, substantially as described.

9. The combination, with a tubular key-casing having an aperture in its end and a designating card or tablet contained therein, of a ballot-indicating key located within the casing, having an operating portion projecting from one side thereof, substantially as described.

10. The combination, with a plate or support having an aperture therein and a ballot-indicating key adapted to be operated through said aperture, of a key-casing on one side the plate and a counter actuated by the key on the other side, and a single bolt passing through the plate, securing the casing and counter together and to the plate, substantially as described.

11. The combination, with a plate or support having apertures therein and a series of ballot-indicating keys operating through them, of a series of key-casings on one side the plate constructed in two parts, said parts abutting and having interlocking projections and recesses, a series of counters, one for each key, and a series of bolts passing through the counters and engaging the sections of adjacent key-casings, substantially as described.

12. The combination, with a series of indicating-keys having the pointed ends, of a series of blocks arranged between them, having beveled sides, and preventing the operation of more than one of the series, and a series of counters having sliding projections provided with beveled sides for the engagement of the key ends, substantially as described.

13. The combination, with two or more indicating-keys, of a series of counters operated thereby, having the guides formed upon them, and a series of sliding blocks held in place by said guides, substantially as described.

14. In a voting-machine, the combination, with two counters and movable blocks or slides for actuating them, of a pivoted lever co-operating with each and preventing the operation of one when the other is actuated, substantially as described.

15. In a voting-machine, the combination, with two ballot-indicating keys and a retaining-dog for each key, of counters having movable blocks operated upon by the keys and a lever arranged between said blocks for preventing the operation of more than one key, substantially as described.

16. In a voting-machine, the combination, with a counter having a counter-actuating slide or block provided with a series of notches, of a catch or dog co-operating with said notch and a key for actuating said slide, substantially as described.

17. In a voting-machine, the combination, with a ballot-indicating key, a counter operated thereby, and a counter-actuating slide or block provided with a series of notches, of a catch or dog for co-operating with the notches on the slide and adapted to engage and lock the key when fully operated, substantially as described.

18. In a voting-machine, the combination, with a series of counters, a series of ballot-indicating keys for operating them, and a series of locking-dogs for the keys projecting across between the counters, of a series of movable rods arranged between the counters for simultaneously releasing all of said locking-dogs, substantially as described.

19. In a voting-machine, the combination, with a series of indicating-keys and a series of counters actuated thereby, of a movable bar, a series of dogs or catches thereon, a series of movable blocks operated by the keys with which the dogs engage, and a stop for limiting the movement of the said bar, substantially as described.

20. In a voting-machine, the combination, with a series of indicating-keys and a series of counters actuated thereby, of a movable bar, a series of dogs or catches thereon having two or more engaging portions, a series of movable blocks operated by the keys with which the dogs engage, and a stop for limiting the movement of the bar, substantially as described.

21. In a voting-machine, the combination, with a series of indicating-keys and a series of counters actuated thereby, of a movable bar, a series of dogs or catches thereon having two or more engaging portions, a spring for actuating the bar in one direction, a series of movable blocks operated by the keys with which the dogs engage, and a stop for limiting the movement of the bar, substantially as described.

22. In a voting-machine, the combination, with two series of indicating-keys, of two progressively-moving bars actuated thereby and connections between said bars for locking both after the operation of a predetermined number of keys, substantially as described.

23. In a voting-machine, the combination, with two series of indicating-keys, each series indicating a different set of candidates for the same office, of interlocking devices between the keys of the two series for preventing the operation of more than two in both of them, substantially as described.

24. In a voting-machine, the combination, with a series of indicating-keys, a series of counters actuated thereby, and locking devices for retaining said keys after being operated, of a movable bar, a series of dogs or catches thereon having two or more engaging portions, a series of movable blocks actuated by the keys with which the dogs engage, and a stop for limiting the movement of the bar, substantially as described.

25. In a voting-machine, the combination, with a series of indicating-keys, a series of counters actuated thereby, and locking devices for retaining said keys, of a bar actuated progressively by the movement of said keys and a stop for limiting its movement, substantially as described.

26. In a voting-machine, the combination, with two series of indicating-keys, two series of counters actuated thereby, and locking devices for retaining said keys, of two bars, one for each series, actuated progressively by the movement of the keys, and connections between said bars for locking both after the operation of a predetermined number of keys, substantially as described.

27. In a voting-machine, the combination, with a series of indicating-keys and a series of locking-dogs therefor, of a movable bar and a series of dogs or catches thereon, a series of blocks operated by the keys with which the dogs co-operate, and movable pins or projections operating to release both said series of dogs, substantially as described.

28. In a voting-machine, the combination, with two series of indicating-keys, of two progressively-moving bars actuated thereby and the pivoted lever adapted to be engaged by both the said bars, substantially as described.

29. In a voting-machine, the combination, with a series of counters having flanges formed upon their upper sides provided with apertures 50 and a series of movable blocks guided by said flanges, of the stationary blocks, the pins passing through the apertures 50 and the blocks, and a series of indicating-keys adapted to be inserted between the blocks of the series, substantially as described.

JACOB H. MYERS.

Witnesses:
JAMES J. ALLEN,
C. D. KIEHEL.